Jan. 7, 1964    J. B. SMITH    3,116,546
METHOD OF MAKING A PIPE COUPLING
Original Filed Sept. 24, 1958    2 Sheets-Sheet 1

INVENTOR.
JOSEPH B. SMITH
BY RICHEY, McNENNY & FARRINGTON
N. F. McNenny
ATTORNEYS

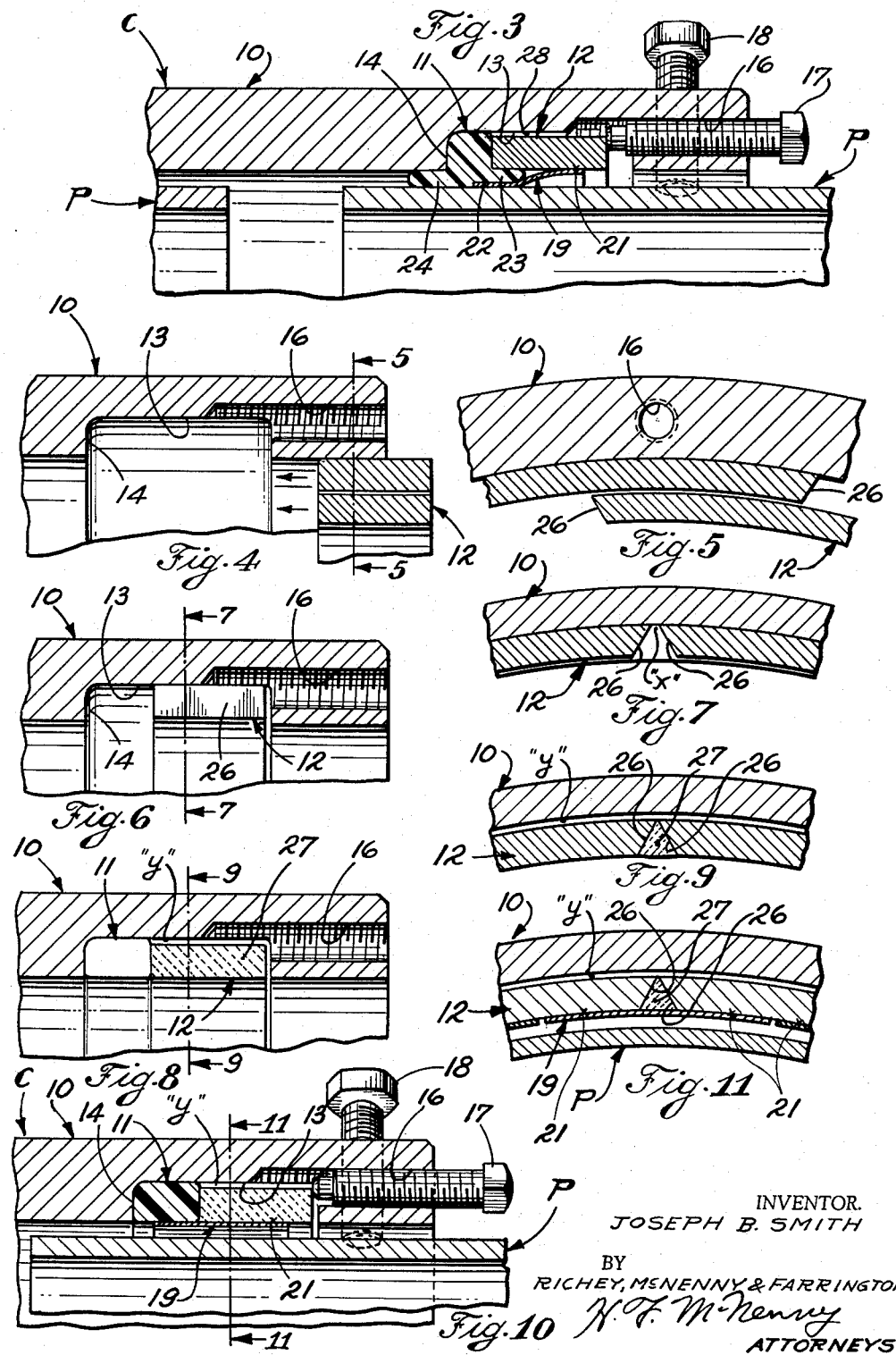

3,116,546
METHOD OF MAKING A PIPE COUPLING
Joseph B. Smith, 5350 W. 130th St., Cleveland, Ohio
Original application Sept. 24, 1958, Ser. No. 763,029, now Patent No. 3,028,180, dated Apr. 3, 1962. Divided and this application Oct. 31, 1961, Ser. No. 148,887
2 Claims. (Cl. 29—434)

This invention relates to a method of forming a pipe coupling of the type that can be attached to the end of a pipe or to opposed ends of separate pipes in the field and without threading or special preparation of the pipe ends. The coupling made in accordance with the method of the present invention is of the general type disclosed in my Patent 2,567,243, September 11, 1951. The coupling is particularly useful in coupling industrial pipes including those that must withstand high pressures. Typical applications are for pipes conducting crude petroleum, gasoline, gas, asphalt, steam, etc. Many such pipes are relatively large, their size lying approximately in the range of 2 to 36 inches or larger in diameter, and the pipe connections laid are made in the field while the pipe is being laid or repaired and which must withstand fluid pressures as high as 2,000 to 3,000 p.s.i.

The pipe coupling constructed in accordance with the method of the present invention can be used in either of two ways: it can be used as a detachable and re-attachable fitting, or it can be used as a fitting that can be attached in the field and permanently welded to the pipe while the pipe is conducting its full capacity of fluid at working pressure. The coupling can be used either for initial connection of pipe ends while the pipe is being laid, or it can be used to connect replacement lengths of pipe into an existing installation. In its detachable form the coupling can be removed and re-attached repeatedly, as might be the case wherein the pipe conducts fluids containing an abrasive material such as sand or the like that tends to damage the rubber sealing gasket forming a part of the coupling. When the coupling is eventually to be welded in place, before the weld is made, it provides a seal that is more than adequate to permit full service operation for days or weeks after attachment, thereby insuring safe welding conditions, and permitting clean up of surrounding oil-soaked earth resulting from prior leakage, etc.

Where the coupling is used as a sleeve to join opposed pipe ends, it permits relatively wide gaps between the ends thereby eliminating the requirement of accurate cutting to length in case of a repair insert, or accurate lengthwise alignment of the pipe ends in case of initial installations.

The cost of a sleeve-type form of the coupling constructed in accordance with the method of this invention is about that of a pair of conventional bolted pipe flange fittings, which fittings do require relatively accurate lengthwise alignment of the pipe ends, although if a bolted flange type coupling embodying the invention is desired, as might be the case wherein a pipe end is connected to a valve or to a pump, the same facility of dispensing with precise lengthwise alignment of the pipe is obtained.

Briefly, the coupling constructed in accordance with the method of this invention includes a steel sleeve that either surrounds the pipe at both ends, or connects at one end to the pipe and is flanged at the other end. The sleeve fits the pipe loosely but is clamped to and centered on the pipe by a series of radial bolts to withstand axial forces. The sleeve is formed of good quality rolled or mild steel plate, formed into a cylinder and welded, the weld being carefully tested by X-ray or other means to insure that it is homogeneous. Referring to the sleeve-type coupling, for example, adjacent each end of the steel sleeve, but spaced axially inwardly thereof, is an internal annular groove. An endless steel thrust ring is freely slidable in the groove. In accordance with the present invention, this ring is initially formed as a split ring with internally bevelled ends that are welded together after insertion into the groove in the sleeve. When this weld congeals it shrinks, reducing the circumference of the ring somewhat to give a free sliding fit that reduces any tendency of the ring to bind in the sleeve during final attachment to the pipe end. With this construction the sleeve can be of rolled or mild steel even though the thrust ring is continuous and it is not necessary to cast the sleeve around the thrust ring to attain such as assembly. A series of axial thrust bolts threaded through the outer end portion of the sleeve is provided to force the thrust ring axially inwardly.

Preferably, after the split thrust ring is fitted into the sleeve and rendered solid by welding at its ends, a thin walled flexible metal shield is welded to the inner wall of the guard ring, which shield projects axially inwardly past the inner edge of the thrust ring. This construction, which is disclosed and claimed in my copending application Serial No. 763,029, filed September 24, 1958 now Patent Number 3,028,180, provides a partially closed annular chamber bounded by the axially inner wall of the internal groove in the sleeve, a portion of the circumferential wall of the groove, the inner end of the thrust ring, and the thin walled metal shield. There is a gap between the free end of the metal shield and the axially inner wall of the groove in the sleeve. A sealing ring of rubber-like material is fitted into the groove at the axially inner end of the thrust ring. In use, the sealing ring extrudes into the aforesaid gap and engages the wall of the pipe in response to the force exerted against the thrust ring by setting up of the axial thrust bolts, such axial force being resisted by the action of the radial clamping bolts. The rubber sealing ring not only engages the wall of the pipe, but it flows axially along the pipe in both directions. The end or lip portion of the metal shield is forced against the pipe wall by the sealing ring and the rubber-like material flows into the pocket formed by the shield and the thrust ring, which action is facilitated by forming the shield as a circumferentially discontinuous member in the sense that it is readily radially inwardly deflected and reduced in circumference by the rubber ring. Preferably this action is obtained by forming the shield ring 19 with one or more axial slits. The material of the sealing ring also flows axially inwardly into the gap provided between the pipe wall and the sleeve, providing an externally effective seal in this area. If a permanent or welded installation is desired, once fluid flow through the pipe is established the radial clamp bolts and the axial thrust bolts are cut off or are burned off with the welding apparatus, and the ends of the bolts are weld-sealed to the sleeve. At the same time a fillet weld is made to close the gap between the end of the sleeve and the pipe and because of the construction of the fitting and the fact that it will seal against full line pressure and flow, the welding operation can be performed with the pipe line conducting fluid rendering the welding operation safe and there is no damage to the rubber sealing ring. During weldings, one of the radial clamping bolts can be removed or pierced to vent any gases that may be produced due to fluid trapped in the spaces lying axially outwardly of the sealing ring.

It is a general object of this invention to provide a novel and improved method of making a pipe coupling.

Another object of this invention is to provide a novel method of making a pipe coupling which is characterized by improved ease of assembly.

Further objects and advantages of this invention can be more completely and specifically understood from the following detailed description of a preferred embodiment of the invention taken in conjunction with the appended drawings.

In the drawings:

FIG. 3 is a radial section taken on 3—3 of FIG. 1 showing an assembled coupling and pipe end;

FIG. 4 is a similar section taken showing insertion of the unwelded thrust ring;

FIG. 5 is a section taken on 5—5 of FIG. 4;

FIG. 6 is a section like that of FIG. 4 taken after the thrust ring and sealing ring are in place but before the ends of the thrust ring are closed by welding;

FIG. 7 is a section taken on 7—7 of FIG. 6;

FIG. 8 is a section like that of FIG. 6 taken after the ends of the thrust ring have been welded together—the gap between the thrust ring and the sleeve established as a result of the welding operation appears;

FIG. 9 is a section taken on 9—9 of FIG. 8;

FIG. 10 is a section like that of FIG. 3 but taken before the axial thrust bolts are set up;

FIG. 11 is a section taken on 11—11 of FIG. 10;

Figure 1:
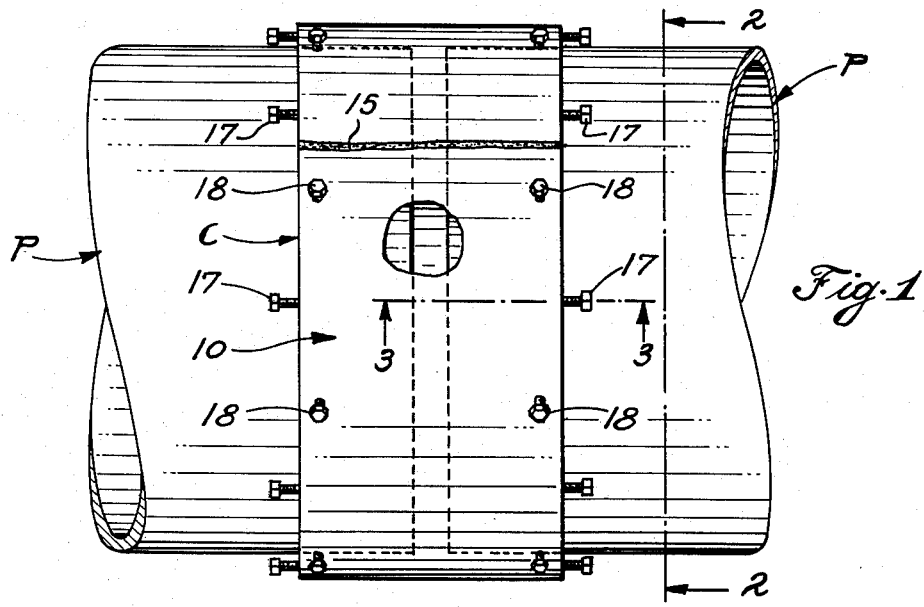
FIG. 1 is an elevation of an assembled sleeve type coupling constructed in accordance with the method of this invention, in its unwelded condition.
Figure 2:
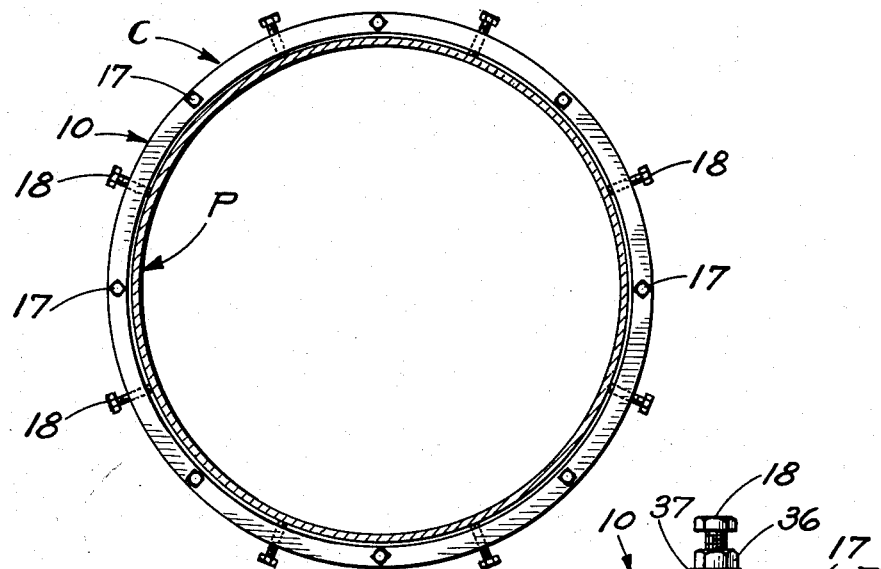
FIG. 2 is a section taken on 2—2 of FIG. 1.

Referring to the embodiment of the invention of FIGS. 1 to 12 a sleeve type coupling C for joining the opposed ends of pipes P appears. The assembled coupling and pipe permits establishment of a substantial gap between the pipe ends as seen in FIGS. 1 and 3 which provides the advantages relative to initial installation or replacement of a section referred to. The coupling comprises a steel sleeve 10 surrounding the pipe ends, a pair of sealing rings or gaskets 11, and a pair of thrust rings 12 slidable in internal grooves 13 formed adjacent each end of the sleeve 10. The grooves 13 in the sleeve are formed with axially inner end walls 14 for axially restraining the sealing ring 11. The sleeve 10 is formed from high quality steel plate or mild steel to provide a strong joint, the edges of the formed plate being welded together longitudinally at 15, FIG. 1, to render the sleeve endless.

The sealing ring 11 is preferably formed of rubber or rubber-like material that is relatively heat resistant, such as Neoprene or a silicone base rubber, to insure that the sealing ring will not be damaged and will retain its nerve during the welding operation. However, since the welding operation is usually performed with the pipe full of flowing fluid, under certain flow conditions or with certain liquid fluids flowing along the pipe, natural or synthetic rubber such as C–RS can be used for the sealing ring. Further, other rubber-like materials exhibiting the characteristics of rubber can be used, such as plasticized polyvinyl chloride or the like.

The ends of sleeve 10 are axially drilled and tapped as at 16 to receive a circumferential series of axial thrust bolts 17 the inner ends of which bear against the axially outer edge of the thrust ring 12 in order that the sealing ring 11 may be deformed into sealing engagement with the parts.

In order to initially maintain the coupling and pipes in assembled relation and to resist axial spreading forces engendered by both the setting up of axial thrust bolts 17 and the axial spreading effect of fluid under pressure flowing through the pipe line after the initial assembly is made, a circumferential series of radial clamp bolts 18 (FIGS. 1 to 3 and 10) are threaded into tapped holes in the sleeve, these bolts having hardened, cupped ends for gripping the pipe ends.

In order to improve and render positive the sealing action of the rubber ring 11, thin walled, flexible, metal shield ring 19, which is preferably segmented, is welded at 21 to the inner wall of thrust ring 12. These flexible shield segments project past the axially inner end of the thrust ring 12 forming a radially deformable lip portion 22, but the shield 19 stops short of wall 14 of the internal groove 13 formed in sleeve 10 in order to provide a gap to permit extrusion of the material of the sealing ring against the pipe wall under the force exerted by the thrust ring 12 and axial thrust bolts 17. As seen in FIG. 3, when the assembly is completed, material of the sealing ring extrudes axially in both directions. The material presses the lip portion 22 of the flexible metal shield 19 firmly against the pipe wall and some of the material extrudes, as at 23, into the blind or closed pocket formed by the deformed shield 19 and thrust ring 12. This arrangement of shield and thrust ring with the resulting blind pocket limits or confines extrusion of the material of the rubber sealing ring in the axially outward direction, thereby insuring that there will be sufficient axial inward extrusion as at 24 for firm, pressure engagement between the thrust ring and the wall of the pipe. The seal here is important, because leakage past this lip either along the pipe or along the sleeve conducts fluid out of the coupling. The controlled extrusion of the sealing ring attained by this invention has another important advantage in that should the sleeve and pipe end be clamped together somewhat eccentrically, because of the limited and controlled axially outward extrusion of the sealing ring, there will be ample pressure-extruded sealing ring material at the wider spaces between the pipe and the external sleeve to provide an effective, high pressure seal entirely around the pipe.

FIGURES 4 to 11 illustrate successive steps in the method of the present invention for assembling the coupling with a pipe before the sealing ring is pressed against the pipe as shown in FIG. 3. Referring to FIGS. 4 and 5, the initially split thrust ring 12 is shown partially inserted into the sleeve, with the free ends of the ring overlapped to contract the ring for insertion. The free diameter of the ring is at least equal to the diameter of circumferential wall of the groove 13 in the sleeve, or the free diameter of the ring may be somewhat greater than the groove diameter so that after insertion the ring presses against the outer groove wall.

It will be noted in FIGS. 5 and 7, for example, that the free ends of the thrust ring are beveled as at 24, to provide a pocket for reception of the weld metal. It will also be noted in FIG. 7 that there is a small gap "x" between the radially outermost ends of the thrust ring when the latter has assumed its expanded position in place in the sleeve groove. It has been mentioned that it is desired to provide a clearance between the thrust ring and the wall of the sleeve groove when the thrust ring is in its final, endless condition to avoid binding of the ring in the groove. This clearance, indicated at "y" in FIGS. 8 to 12, is automatically established after weld metal 27 has been deposited at the beveled ends 26 of the thrust ring, because as the weld metal cools it shrinks and reduces the diameter of the ring.

As seen in FIG. 10, the sealing ring 11 is next inserted in the groove in sleeve 10 after which the sleeve 19 is welded as at 21 to a mid-portion of the inner wall of thrust ring 12. Shield weld 21 may be either a line weld or a tack weld because this is a mechanical joint that need not seal against leakage of fluid. The axial thrust screws 17 and the radial clamp screws 18 may now be threaded into the sleeve either before or after insertion of the pipe P into the coupling assembly. FIG. 10 shows the pipe radially clamped and centered by clamp screws 18 before thrust screws 17 are set up to make the seal indicated in FIG. 3.

After the various couplings in the line are assembled as shown in FIG. 3 the pipe line may be opened for fluid flow under pressure, and as mentioned previously, such an assembly will in and of itself withstand high pressure service conditions without leakage.

Figures 12, 13:
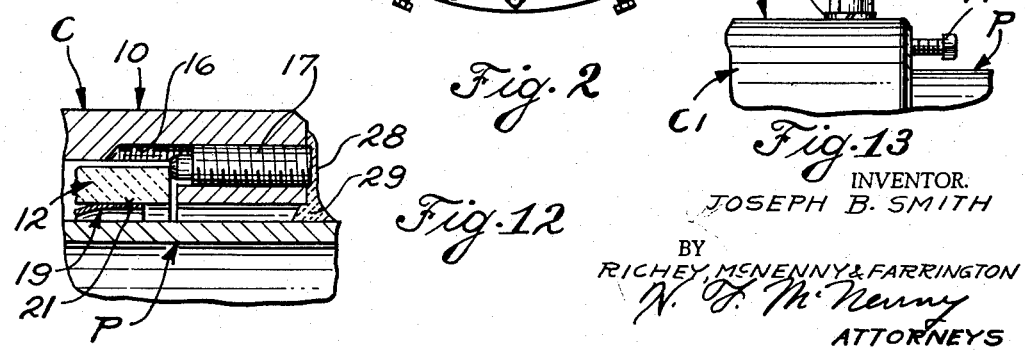
FIG. 12 is a radial section taken through one of the axial thrust bolts after completion of the bolt and seal and fillet welding operations.
FIG. 13 is an elevation of an alternative embodiment, wherein no welding to the pipe is to be performed so that the radial clamp bolts are locked in place with lock nuts and washers.

FIG. 12 shows the welded condition of the assembly at one of the thrust bolts 17. The protruding ends of the bolts are cut or burned off and sealing welds 28 are made over the ends of the severed bolts, and similar sealing welds are made over the cut ends of clamping bolts 18. In addition, a fillet weld 29 is deposited at the gap between the end of the sleeve and the pipe. If any of the bolts are of high carbon steel, they may be made in the form of recessed set screws or recessed cap screws and the external recesses at the screws plug welded as disclosed and claimed in my aforesaid Patent No. 2,567,243.

FIG. 13 shows a coupling and pipe assembly wherein the coupling C1 is arranged to remain detachable and reattachable. In this form of the invention the radial clamp bolts 18 are provided with lock nuts 36 and lock washers 37 to maintain the clamping force under vibration and other conditions. Of course, welding operations can be performed on such an assembly by severing the bolts and proceeding as described relative to the form of FIG. 12.

By way of example, there appears below the physical characteristics of a typical sleeve-type assembly for a large pipe, but the example is not to be construed as limiting.

Pipe size: 34" diameter—⅜" wall thickness
Sleeve: 16" long—2" thick steel
Thrust ring: 2" long—⅝" thick steel
Clamp bolts: 28 bolts—size ¾"—10 (hardened cup ends)
Thrust screws: 28 screws—size ⅝"—11 (may be hardened)
Guard sleeve: 2" long—1/16" thick steel
Sealing ring: 1 1/16" long—⅝" thick In addition to the advantages of the coupling of this invention explained as this description of a preferred embodiment has proceeded, other advantages will be mentioned. Although the sleeve and thrust ring are both made of steel and although the thrust ring lies in a groove in the sleeve, the complete thrust ring is endless and so presents an essentially flat surface to the rubber-like sealing ring regardless of variations in force applied by the axial thrust screws during and after assembly. This prevents possible damage to the sealing ring adjacent the initially free ends of the thrust ring. Although the sleeve 10 may be formed of high quality steel instead of cast metal the method of assembly disclosed makes possible the provision of an integral steel ring in an axially blind groove with a radial clearance between the sleeve and the groove wall. Also, there need be no welding of the sleeve after assembly with the sealing ring or with the pipe end.

The advantages of the guard or shield 19 in the assembly in that a free clearance between the pipe and sleeve 10 can be provided while controlling the extrusion and sealing action of the rubber-like sealing ring have been mentioned and greatly contribute to the effectiveness, security and safety of the assembled joint. The guard ring 19 is a simple flat (cylindrical) strip of steel, brass or the like that cannot be accidentally dislodged and need not be interposed between the inner end face or edge of the thrust ring and the rubber-like sealing member so that the fluid seal is between the three basic elements of the assembled coupling, namely the pipe, the sleeve and the inner exposed end of the thrust ring, so that no reliance need be placed on a fluid seal between the guard sleeve and other parts of the assembly.

It is also an advantage that there need be no bolts passing through either the thrust ring or the sealing ring so that the thrust ring is not weakened by bolt holes, has a smooth edge engaging the sealing ring and the thrust bolts do not conduct welding heat to the sealing ring. Also, no seal between the bolts and sealing ring need be formed.

Although the foregoing description is necessarily of a detailed character, in order that the invention may be completely set forth, it is to be understood that modifications of detail may be resorted to without departing from the scope or spirit of the invention as herein claimed.

This application is a division of my copending application, Serial No. 763,029, filed September 24, 1958, now Patent Number 3,028,180.

What is claimed is:

1. The method of forming a pipe coupling comprising the steps of forming an internal axially extending groove in a circumferentially endless sleeve having cylindrical pipe receiving bores on each side of said groove, said groove having a cylindrical outer wall of greater diameter than that of said pipe receiving bores and a pair of radially extending side walls extending between said pipe receiving bores and said outer groove wall, forming a longitudinally and radially split one piece rigid steel thrust ring having an axial length shorter than the axial length of said groove and having a free outer diameter at least as great as that of the outer wall of said groove and an outer circumferential length less than that of the outer wall of said groove to provide a gap at the free ends of the ring, said thrust ring having opposed faces on the free ends at said gap, partially elastically collapsing said ring to a diameter smaller than the diameter of the bore of the sleeve by overlapping the ends thereof, inserting said partially collapsed ring through the end of said sleeve and allowing said partially collapsed ring to expand in said groove with the outer periphery of said ring in contact with the outer wall of said groove and the opposed faces on the free ends of the ring spaced circumferentially from one another, filling the gap between said opposed faces with hot molten weld metal that contracts upon cooling to join the ends of the ring together by the hot metal into a rigid endless ring, allowing said weld metal to cool and contract to decrease the outer diameter and circumferential length of said ring to establish a clearance between the outer surface of the ring and the outer groove wall to allow the ring to slide axially within the groove, inserting a rubber-like sealing member in said groove axially inwardly of the welded thrust ring, and providing means to force said thrust ring axially inwardly against said sealing member.

2. The method of forming a pipe coupling comprising the steps of forming an internal axially extending groove in a circumferentially endless sleeve having cylindrical pipe receiving bores on each side of said groove, said groove having a cylindrical outer wall of greater diameter than that of said pipe receiving bores and a pair of radially extending side walls extending between said pipe receiving bores and said outer groove wall, forming a longitudinally and radially split one piece rigid steel thrust ring having an axial length shorter than the axial length of said groove and having a free outer diameter at least as great as that of the outer wall of said groove and an outer circumferential length less than that of the outer wall of said groove to provide a gap at the free ends of the ring, said thrust ring having the opposed faces on the free ends at said gap beveled to provide a pocket for receiving weld metal, partially elastically collapsing said ring to a diameter smaller than the diameter of the bore of the sleeve by overlapping the ends thereof, inserting said partially collapsed ring through the end of said sleeve and allowing said partially collapsed ring to expand in said groove with the outer periphery of said ring in contact with the outer wall of said groove and the opposed faces on the free ends of the ring spaced circumferentially from one another, filling the gap between said opposed faces with hot molten weld metal that contracts upon cooling to join the ends of the ring together by the hot metal into a rigid endless ring, allowing said weld metal to cool and contract to decrease the outer diameter and circumferential length of said ring to establish a sufficient clearance between the outer surface of the ring and the outer groove wall to allow the ring to slide axially within the groove, inserting a rubber-like sealing member in said groove axially inwardly of the welded thrust ring, and providing means to force said thrust ring axially inwardly against said sealing member.

References Cited in the file of this patent

UNITED STATES PATENTS

| | | |
|---|---|---|
| Re. 22,251 | Stresau | Jan. 12, 1943 |
| 1,561,065 | Eggleston | Nov. 10, 1925 |
| 1,873,245 | Abegg | Aug. 23, 1932 |

FOREIGN PATENTS

| | | |
|---|---|---|
| 660,246 | Great Britain | Oct. 31, 1951 |